No. 848,591. PATENTED MAR. 26, 1907.
E. HAIMAN & G. N. MURRAY.
HAND CULTIVATOR.
APPLICATION FILED JAN. 14, 1907.

2 SHEETS—SHEET 1.

WITNESSES:
E. M. Fisher
F. C. Mussun.

INVENTORS,
Elias Haiman
George N. Murray
BY
Fisher & Mott
ATTORNEYS

No. 848,591. PATENTED MAR. 26, 1907.
E. HAIMAN & G. N. MURRAY.
HAND CULTIVATOR.
APPLICATION FILED JAN. 14, 1907.
2 SHEETS—SHEET 2.
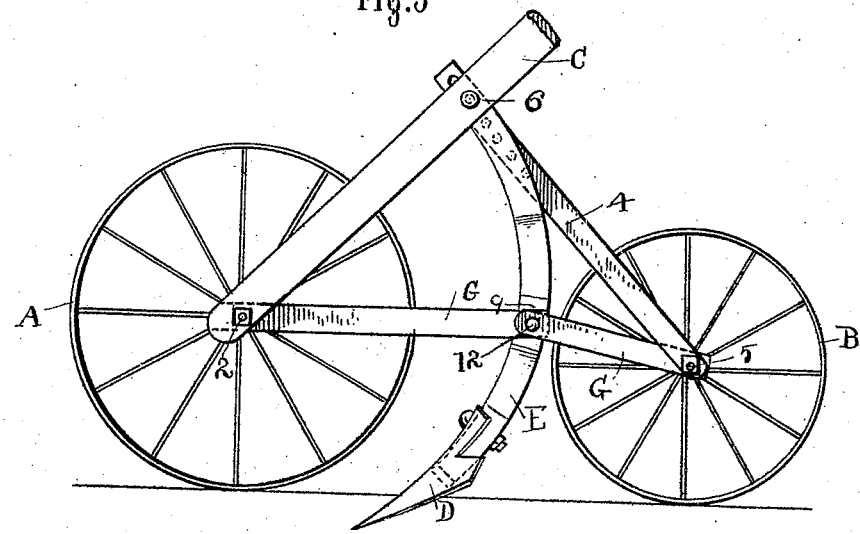
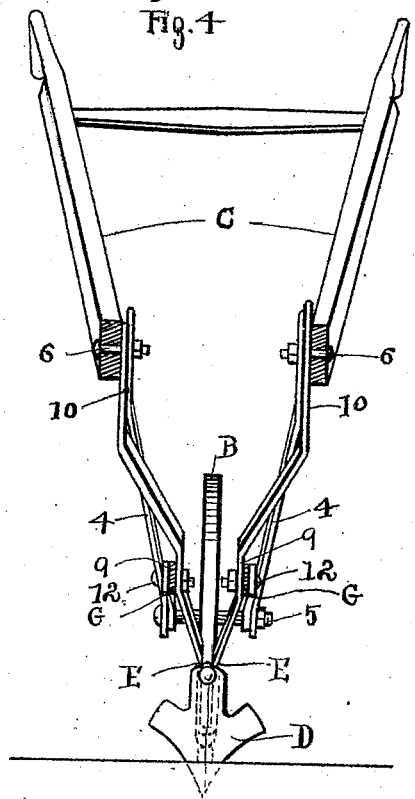
WITNESSES:
INVENTORS.
Elias Haiman
George N. Murray
BY Fisher & Moart
ATTORNEYS

UNITED STATES PATENT OFFICE.

ELIAS HAIMAN AND GEORGE N. MURRAY, OF CLEVELAND, OHIO, ASSIGNORS TO THE EMPIRE PLOW COMPANY, OF CLEVELAND, OHIO, A CORPORATION.

HAND-CULTIVATOR.

No. 848,591.   Specification of Letters Patent.   Patented March 26, 1907.

Application filed January 14, 1907. Serial No. 352,074.

*To all whom it may concern:*

Be it known that we, ELIAS HAIMAN and GEORGE N. MURRAY, citizens of the United States, residing at Cleveland, in the county of Cuyahoga and State of Ohio, have invented certain new and useful Improvements in Hand-Cultivators; and we do declare that the following is a full, clear, and exact description of the invention, which will enable others skilled in the art to which it appertains to make and use the same.

Our invention relates to hand-cultivators; and the invention consists in a cultivator constructed and adapted to operate substantially as shown and described, and particularly pointed out in the claims.

Figure 1:
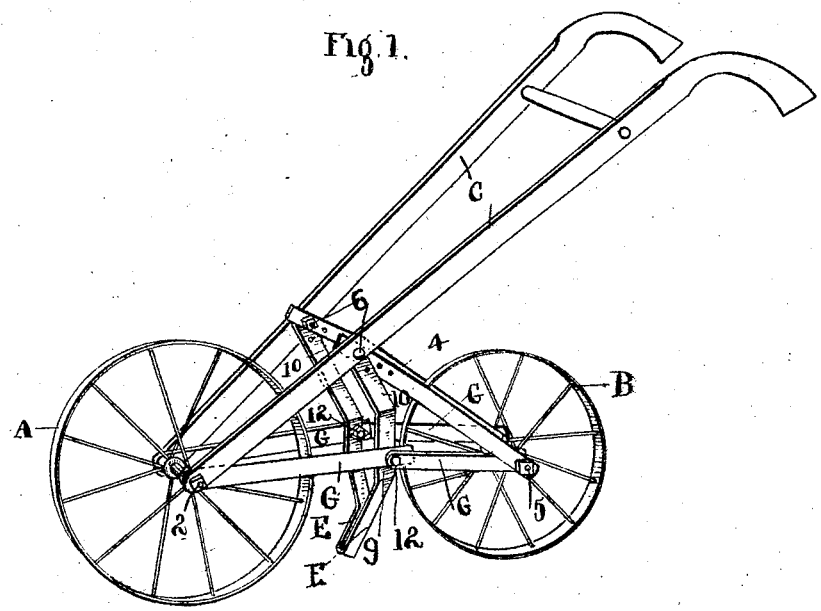
Figure 2:
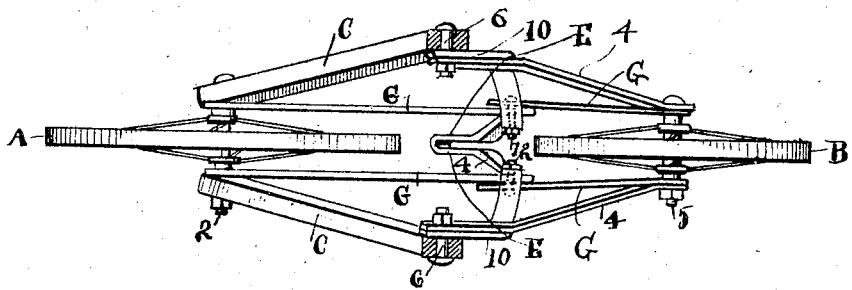

In the accompanying drawings, Figure 1 is a perspective elevation of the cultivator, and Fig. 2 is a plan view thereof. Fig. 3 is a side elevation of the cultivator, and Fig. 4 is a cross-sectional elevation in front of the shovel-standard.

The special novelty in this implement is located in the immediate supports for the cultivator-tooth or other attachment—such as a sweep, turning-plow, or the like—and whereby new and advantageous adjustments thereof are obtained.

To these ends the implement comprises front and rear wheels A and B, respectively, handles C, connected with the outer ends of front-wheel spindle 2 and supported by braces 4 from the outer ends of rear spindles 5.

The shovel or cultivator-tooth D is supported adjustably in the two-sided standard E, the sides of said standard diverging and connecting with handles C through short bolts 6, which serve also to affix braces 4 to said handles. Both the said braces and sides of the standard are provided with a series of holes for their respective adjustments; but slots would serve the same purpose if the said bolts 6 were kept tight. The said sides of the shovel-standard are bent to take the form substantially as shown in cross-section, Fig. 4, in which straight portions 9 are shown for connection with side bars G and upper straight portions 10 for connection with the handles and braces 4. The said sectional side bars run in straight parallel lines between spindles 2 and 5 and are well within the outside of the cultivator at either side, as seen in plan, Fig. 2, and the ends of the front and rear sections or portions of said bar meet and overlap at the flat portions of the standard and are secured thereto by a single bolt 12 at each side. This provides a construction of cultivator in which the cultivator-standard is directly secured to the two side bars of the implement at a joint or pivot, while brace-bars 4 are adjusted at the handles to raise or lower the rear ends of said side bars or the rear sections or links thereof, and thereby fix the depth at which the shovel or tool runs in the earth. The standards themselves may participate in this adjustment at the handles, but not necessarily. The standard or standards E are shown in side elevation, so as to come within the radius of these adjustments, Fig. 3, and the depression of the rear wheel will raise the shovel and the raising of it will lower the shovel.

What we claim is—

1. A hand-cultivator having sectional side bars and front and rear wheels on which said bars are supported, and handle-braces connected at their lower ends with the rear wheel and adjustable in respect to said handles at their front ends, and a tooth-supporting standard engaged at the joint between said side bars.

2. The construction of hand-cultivators comprising front and rear wheels set in alinement, side bars connecting said wheels and jointed substantially at their middle between said wheels, handles and braces therefrom to the rear wheel and a two-sided tooth-standard engaged at the joints of said side bars and vertically adjustable in respect to said wheels.

3. A hand-cultivator having front and rear wheels, parallel centrally-pivoted side bars between said wheels, a divided standard engaged with said side bars at the joints therein and adjusting-braces engaged with said standard at their front ends and on the rear-wheel spindle at their rear ends.

In testimony whereof we sign this specification in the presence of two witnesses.

ELIAS HAIMAN.
GEORGE N. MURRAY.

Witnesses:
H. T. FISHER,
R. B. MOSER.